United States Patent [19]

Ballas et al.

[11] 4,112,653
[45] Sep. 12, 1978

[54] LAWN MOWER AND METHOD

[75] Inventors: George C. Ballas; Albert W. Mitchell, both of Houston, Tex.

[73] Assignee: Weed Eater, Inc., Houston, Tex.

[21] Appl. No.: 674,323

[22] Filed: Apr. 7, 1976

[51] Int. Cl.² .......................................... A01D 55/18
[52] U.S. Cl. .................................... 56/12.7; 56/17.5; 56/295
[58] Field of Search ...................... 56/295, 12.7, 16.7, 56/17.5, 255; 30/276; 15/198

[56] References Cited

U.S. PATENT DOCUMENTS

| 3,014,333 | 12/1961 | Clark, Jr. ........................... 56/295 |
| 3,474,608 | 10/1969 | Frick ................................... 56/295 |
| 3,664,102 | 5/1972 | Reber ............................... 56/12.7 X |
| 3,826,068 | 7/1974 | Ballas et al. ......................... 56/295 |
| 3,831,278 | 8/1974 | Voglesonger .................... 56/295 X |
| 3,859,776 | 1/1975 | Ballas et al. ......................... 30/276 |
| 4,065,913 | 1/1978 | Fisher et al. ........................ 56/295 |

FOREIGN PATENT DOCUMENTS 1,281,450  12/1961  France ................................. 56/295 X Primary Examiner—Jay N. Eskovitz
Attorney, Agent, or Firm—Bard and Groves

[57] ABSTRACT

A rotary-type lawn mower is provided with cutting means comprised of a rotatable disc-like member having a plurality of flexible non-metallic cords projecting radially from its perimeter. The disc-like member is rotated within the cutting plane by a suitable power source such as a conventional gasoline-driven engine, and at a velocity such that the projecting cords function to sever the grass in a substantially conventional manner. The cords are therefore of a length and diameter which are functionally related to effective cutting and are mounted within the disc-like member in brackets formed to support the cords against vertical as well as lateral deflection resulting from contact with the grass sought to be cut.

34 Claims, 23 Drawing Figures

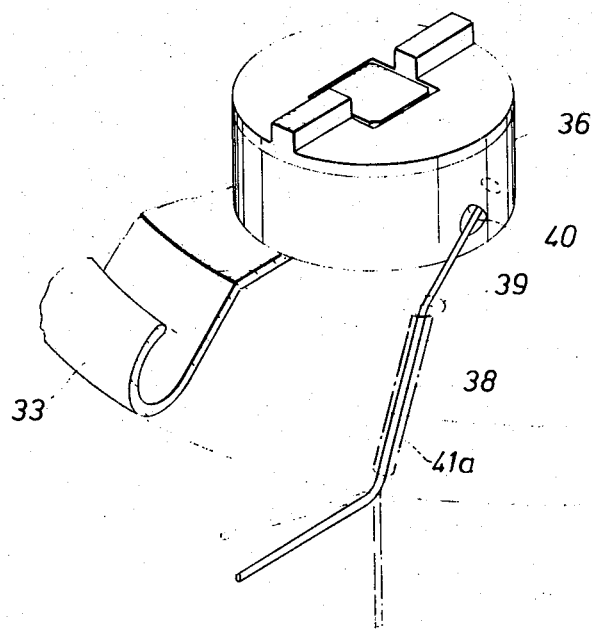
FIG. 15
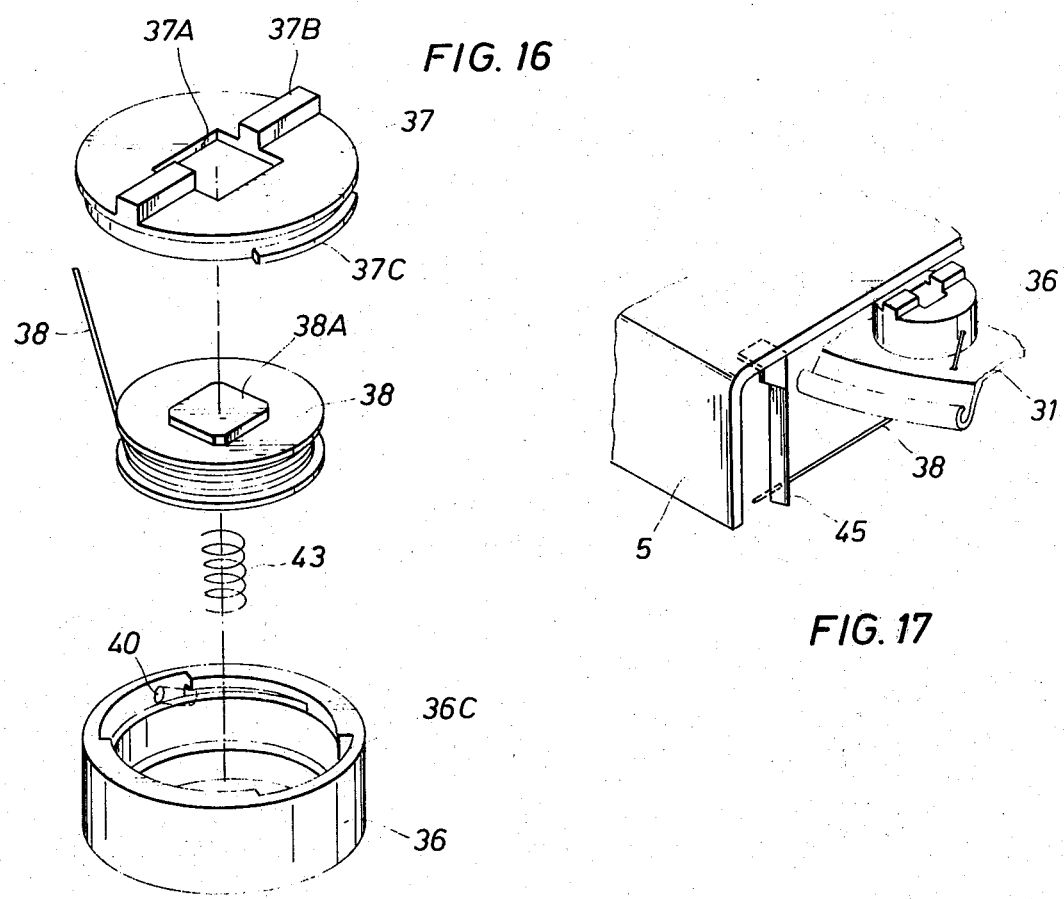
FIG. 16
FIG. 17

LAWN MOWER AND METHOD

BACKGROUND OF INVENTION

This invention relates to methods and apparatus for cutting vegetation and the like, and more particularly relates to improved lawn mowing methods and apparatus.

It is now common practice to provide a greensward in conjunction with most residential and other structures intended for human use and occupancy, not only to enhance the overall esthetic appear of such structures, but also to provide an area associated therewith for purposes of recreation and relaxation. It is also common practice to maintain such greensward in a mowed condition to further enhance its usefulness in this regard, and thus various forms of mowing devices have been devised and employed to more effectively mow such areas.

Many different forms of apparatus have been devised and made available for mowing a greensward and the like, although most of these devices may be characterized as either a "reel-type" mower or a "rotary-type" mower. Both of these types of mowers are sufficiently well known so as not to require explanation, except to note that they both employ one or more moving steel blades to sever the grass to a substantially uniform height. It is also well known that the rotary-type mower is inherently more dangerous to persons and property. It is also the most popular type of mower because it is easier to use and also because it is better suited to areas where the grass is either tall or thick or both.

What has not been generally appreciated is the likelihood of serious injury attaching to the use of a conventional rotary-type lawnmower employing a rigid steel blade. However, the National Electronic Injury Surveillance System has estimated that, during 1973 alone, there were 53,350 mower-related accidents serious enough to require hospital treatment.

The manufacturers of rotary-type lawnmowers have not been indifferent to this problem, of course, and have made strenuous efforts to provide against such injuries. For example, all mowers are provided with covers or "shrouds," not only to enclose the blade but also to route stones and other debris struck by the blade along a restricted predetermined route. In addition, these mowers are mounted on widely spaced wheels of relatively small diameter so as to improve their stability. There is a practical limit to such measures, however, and thus a conventional rotary-type mower will apparently always constitute a source of serious injury.

Because of this problem, there have been various attempts to change the basic design of this type of mower or to adopt other radical changes. For example, there is shown in U.S. Pat. No. 2,557,598 a lawn mower which is generally conventional in its overall appearance but wherein the rigid steel blade has been replaced by a disc having a plurality of metal wires extending radially from its perimeter. These wires have substantially less mass than a conventional mower blade, of course, and they are more flexible, and thus more yieldable, under impact. Nevertheless, a revolving steel rod or wire is only slightly less dangerous than a rigid blade, and will project debris with only slightly less force. Also, such a mower is significantly less effective for grass-mowing purposes.

In U.S. Pat. No. 3,091,915, there is disclosed another lawn mower wherein the lower portion of the shroud is provided with a grille-like plate with apertures for admitting the upward thrust ends of the grass and with honed edges at the apertures in the grille plate. The blade is replaced with a brush-like assembly which revolves over the plate to "wipe away" the grass ends sought to be cut, by drawing them over the honed edges in the grille. The bristles of the brush assembly are sufficiently stiff so as to cause the grass to be severed, but they are also sufficiently flexible so as not to project debris in a dangerous manner or to injure any portion of the body which may be inadvertently inserted through the grille member. There can be no dispute that such an arrangement, wherein the cutting member (the grille) is held stationary, is inherently safer than is a revolving steel cutting blade. Cutting effectiveness is basically a function of impact, however (except in a scissor-like arrangement), and thus a mower of this design is only limitedly effective when used in areas having high or dense vegetation.

In U.S. Pat. No. 3,208,209, the conventional rigid blade is replaced with a disc-like member having a plurality of relatively short and resilient wires extending from its periphery. When the disc-like member is revolved, the wires are sufficiently stiff so as to sever vegetation, but are sufficiently flexible so as to yield to any so-called "foreign" object. As will hereinafter be made apparent, however, such an arrangement will not achieve effective mowing without the addition of other features.

In U.S. Pat. No. 3,302,377, there is disclosed a novel cutting member intended to replace the rigid blade in a conventional rotary-type mower and which is formed of composite molded rubber reinforced longitudinally by less elastic fibers. It is claimed that such a blade will either yield to foreign objects such as a shoe sole and the like, or will discharge rocks and other debris at safer velocities. It is also admitted, however, that such a blade is subject to wear during use and that it has a limited useful lifetime.

In U.S. Pat. No. 3,320,732, there is disclosed apparatus which is also intended to replace the conventional rigid metal blade in a rotary lawnmower and which includes a revolvable disc having a pair of non-metallic blades mounted at opposite points on its perimeter. Although the blades are preferably formed of a plastic such as polyurethane, they are intended to be wide enough so as to be substantially rigid, whereby effective cutting is achieved. On the other hand, pivotally attaching the blades to the disc permits them to yield upon encountering a foreign object.

Other examples of devices and apparatus intended to replace the rigid steel blade in a conventional rotary lawnmower may be found in U.S. Pat. Nos. 3,340,682, 3,389,541, 3,444,675, 3,474,608 and 3,664,102. However, none of these or the other innovations cited herein have been a solution to the problem, and thus the rotary lawnmower with a rigid steel blade has continued to be the most widely used device for these purposes.

Recently, a completely new type of vegetation cutting device has been developed and marketed under the trademark "Weed Eater," which device is depicted generally in U.S. Pat. Nos. 3,708,967, 3,826,068 and 3,859,776, and which employs one or more flexible non-metallic cords which are revolved to function as cutting elements. This type of device has enjoyed spectacular commercial success as an edger/trimmer, since it provides a number of advantages which cannot be found in conventional cutters. For example, these cutters are capable of reaching into areas not accessible to rigid steel blades and the like, and thus the Weed Eater trimmer can remove weeds and other vegetation located in close proximity to walls, fences, trees and even within crevices in such walls and the like, without damage to such walls and trees. Second, and more important for present purposes, the Weed Eater trimmer is substantially completely safe to operate since the revolving cords will cause injury under only the most unusual circumstances.

Because of these advantages, as well as others, it has been proposed to construct a lawn mower incorporating this principle to thereby eliminate the hazards which are inherently present with conventional mowers. More particularly, it has been proposed to replace the rigid steel blade in such mowers with a head assembly having one or more such flexible cords and to revolve such assembly and cords to sever the grass on a greensward. This proposal has proved to be deceptively oversimple, however, and is based on a misconception that the Weed Eater edger, as presently built and marketed, is the functional equivalent of a conventional lawn mower. Accordingly, all such attempts to construct an operable lawn mower employing such a cutting element have hitherto been failures for the reasons hereinafter set forth.

It is common practice to broadly characterize all powered grass and weed cutting devices as "lawn mowers," excepting those machines intended to be used by commercial agriculturalists and the like. There is a basic functional distinction between a lawn mower per se, however, and a device which is more accurately denoted as an "edger/trimmer," and this distinction must be clearly understood to appreciate the reason why it has not been possible to merely replace a steel blade with a Weed Eater trimmer head assembly.

The basic principle of any lawn mower per se is that the cutting element or elements are manipulated strictly within a cutting plane which is fixedly located relative to the surface of the area being mowed. The reason for this is that the very concept of "mowing" contemplates the leveling of the grass to produce a carpet-like effect, and thus the blade must be rotated in a plane which is fixedly positioned relative to the surface of the earth. Otherwise, the greensward would have a ragged, uneven appearance after being cut, and this is not the effect or result sought to be achieved.

When a rigid steel blade is revolved in this plane, it yields to the grass only to the extent that it may tend to slow, but it does not become warped or distorted so as to be deflected from its intended cutting plane. If a flexible non-metallic string is revolved to cut vegetation, however, it yields to the grass in various ways. In particular, it not only yields laterally in that it assumes a curvilinear configuration, but it also tends to be deflected upward by the grass it is cutting. Accordingly, if the cords of a Weed Eater are brought into contact with resistant vegetation, these cords tend to move in a cutting "plane" which actually has a warped configuration.

This warping effect is an advantage of the Weed Eater edger/trimmer, since it is this which enables its user to manipulate its cords to cut away the most inaccessible vegetation. When a mower is constructed in the manner of the Weed Eater trimmer, however, this warping effect tends to produce swaths having convex configurations, and this is extremely undesirable from an esthetic standpoint.

An edger/trimmer, and especially the Weed Eater trimmer, is not intended as a leveler, per se, but as hereinbefore stated, is intended to reach vegetation growing in otherwise inaccessible locations. Thus, an edger/trimmer must provide a cutting plane which can be manipulated into a variety of angles with respect to the surface of the earth and, in the case of the Weed Eater edger, must be capable of non-alignment of its cutting elements relative to its normal cutting plane. The Weed Eater trimmer as presently designed and marketed is carried by the operator so as to facilitate such manipulation. Even an edger/trimmer using a revolving steel blade is supported on no more than two spaced-apart wheels in order that its cutting plane may be tilted as needed.

Another functional difference between a rotary-type mower and an edger/trimmer is the diameter of their cutting planes. Cutting actually is accomplished at the tip of the cutting element, whether the element is a flexible cord or a rigid steel blade, and since cutting is a function of tip velocity, it will be apparent that the diameter of the cutting plane must be such as to provide for effective cutting. In the case of a lawn mower, however, the prime consideration in selecting the proper diameter of the cutting plane is the width of the swath sought to be cut.

THEORY OF INVENTION

These disadvantages of the prior art are overcome with the present invention, and novel methods and apparatus are provided for mowing a greensward. More particularly, a rotary-type lawnmower is provided which has a generally conventional configuration, but wherein the rigid steel cutting blade is replaced by a rotatable disc having a plurality of flexible non-metallic cords extending radially therefrom as generally shown in U.S. Pat. No. 3,208,209, whereby the grass may be cut with safety to personnel and property. As will hereinafter be explained in detail, however, other provisions are made whereby the greensward may also be cut as effectively as with a rotating steel blade.

The diameter of the rotatable disc is functionally determinative of the velocity of the tips of the cords, of course, and therefore functionally determinative of their cutting effectiveness. However, the diameter of the disc member is also determinative of the width of the swath sought to be cut, and a typical swath is 18-22 inches wide. In an ideal embodiment of the invention, therefore, a conventional lawnmower will contain a single disc member having a diameter of approximately 15½ to 19 inches, and with one or more flexible cutting lines each radially extending approximately 1¼ inches from its perimeter.

It has been determined that, in a Weed Eater trimmer, a single cord will cut almost as well as will a plurality of such cords, and that the principal advantage to be gained from a plurality of such cords is that the apparatus will continue to cut grass and weeds until all of the cords are broken. In a lawnmower employing cutting members of this type, however, it has been found that there are substantial advantages to using from two to four cords arranged equidistantly about the disc.

The cords are preferably each mounted in the disc member in a bracket which has curvilinear line-bearing surfaces at the perimeter of the disc, in order to support the line against excessive breakage, and which is also preferably formed of a metal or other material having a thermal coefficient different from the material from which the lines are formed. In addition, these brackets are also preferably formed to support the cord against vertical as well as lateral deflection during the cutting operation.

The overall length of these cords is apparently as significant a factor with respect to deflection as is the length of the portion extending outwardly from the perimeter of the disc member. Accordingly, it has been determined that the ideal cutting member for these purposes is a monofilament nylon strand having an overall length at least twice the length of its extended or free traveling portion, and that its diameter is on the order of 0.100 inches or greater.

These and other features and advantages of the present invention will become apparent from the following description, wherein reference is made to the figures in the accompanying drawings.

DRAWINGS

FIG. 15 is another different view of the apparatus depicted in FIG. 12.

FIG. 16 is a pictorial representation of the apparatus depicted in FIG. 15.

FIG. 17 is another pictorial view of the apparatus depicted in FIGS. 11-12.

DETAILED DESCRIPTION

Figure 1:
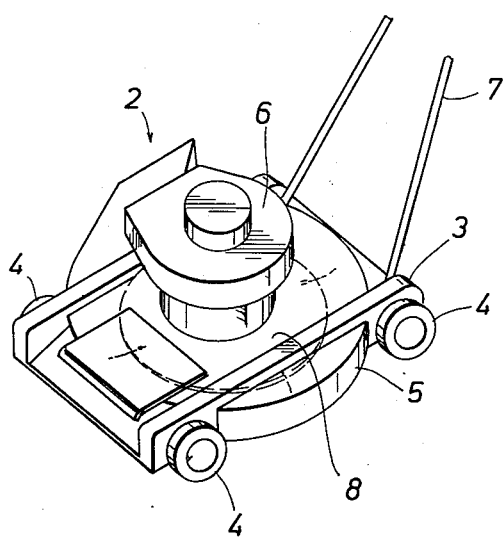
FIG. 1 is a pictorial representation of a rotary lawnmower having a cutting means embodying the present invention.

Referring now to FIG. 1, there may be seen a pictorial illustration of a conventional rotary lawn mower 2 which has been modified to incorporate the principles of the present invention. More particularly, the lawn mower may be seen to have a chassis 3 supported upon a plurality of spaced apart wheels and to be further provided with a shroud 5 for containing a suitable cutting assembly 8 which, in turn, is rotated in a horizontal manner relative to the surface of the earth by suitable engine 6 or other driving means. A suitable handle 7 may also be provided for steering the lawn mower 2 in a conventional manner.

Figure 4:
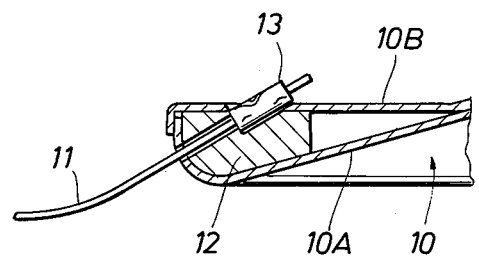
FIG. 4 is a pictorial view, partly in cross section, of a portion of the apparatus depicted in FIG. 2.
Figure 2:
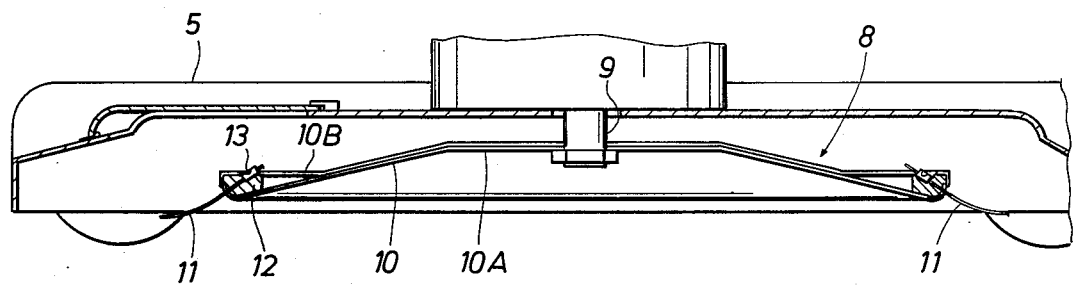
FIG. 2 is a pictorial representation of one form of cutting means suggested in the apparatus depicted in the present invention.
Figure 3:
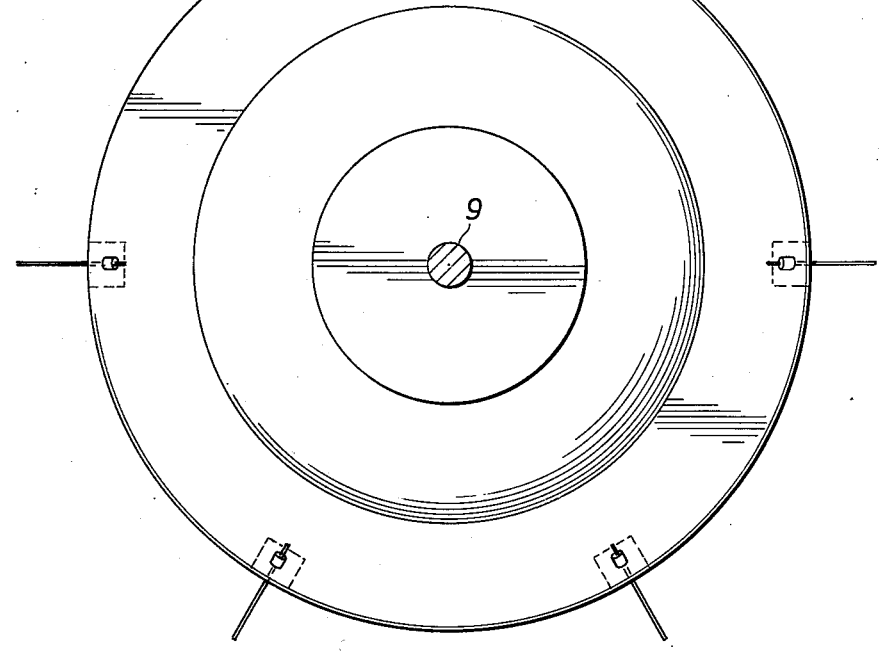
FIG. 3 is a different pictorial representation of the apparatus depicted in FIG. 2.

Referring now to FIGS. 2–4, there may be seen a more detailed pictorial illustration, partly in cross-section, of the cutting assembly 8 suggested in the apparatus depicted in FIG. 1. More particularly, the cutting assembly may be seen to be a dish-like plate member 10 which is concentrically mounted on the shaft 9 of the motor or engine 6 and having a plurality of non-metallic flexible cord members 11 projecting radially from its periphery. As may further be seen, each cord member 11 is peripherally mounted within a bracket or supporting member 12 having a channel-like aperture for holding the member 11 in a manner such as to support the cord against vertical as well as lateral deflection due to contact with the grass sought to be cut. The cord member 11 may also be conveniently provided with a retainer means 13 having the configuration of a sleeve member which supports the cord member against being thrown out of the bracket member 12 due to rotation of the plate 10. As further indicated in FIGS. 2 and 4, the plate member 10 may be comprised of a lower member 10a with a ring-like upper member 10b mounted so as to enclose and support the bracket members 12 in a proper manner. Accordingly, it will be seen that the cord members 11 not only project from an aperture from within the bracket member 12, but also through a suitable aperture in the rim of the lower portion 10a of the plate member 10.

As hereinbefore explained, when the plate member 10 is revolved, the outwardly projecting cord members 11 act to sever the grass as they are revolved within a cutting plane defined by their tips. The lawn mower 2 will be moved progressively in a forward manner so as to cut a suitable swath across the lawn or greensward. As the plate member 10 is revolved, the cord members 11 will accordingly intersect and sever the grass immediately confronting the lawn mower 2, and will not encounter grass except in front of the lawn mower 2. As hereinbefore explained, however, there is a tendency for the cord members 11 to be deflected not only laterally in a swept-back manner, but also to be deflected upwardly in a vertical manner with respect to the plate member 10. Furthermore, as the cord member 11 encounters vegetation in a thicker condition (as it does by rotating across the swath), this vertical deflection will be a function of a thickness of the vegetation. Accordingly, as the cord member passes from the front of the lawn mower 2 and is rotated back towards its rear, the cord member then will drop in a vertical manner to produce an oscillating effect which is undesirable in so far as producing an evenly mowed appearance across the greensward.

Figure 5:
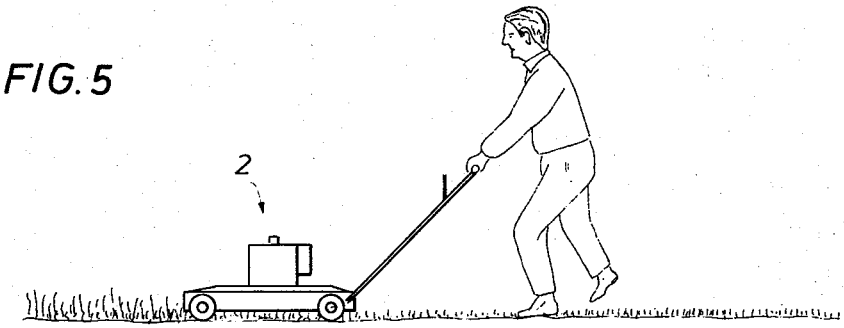
FIG. 5 is another pictorial representation of the apparatus depicted in FIG. 1.
Figure 6:
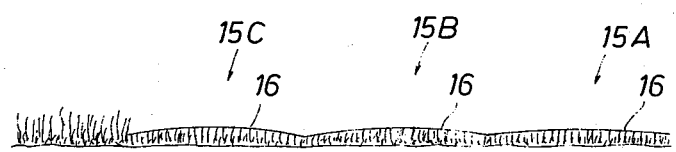
FIG. 6 is a pictorial representation of the configuration of swaths cut in a greensward.
Figure 7:
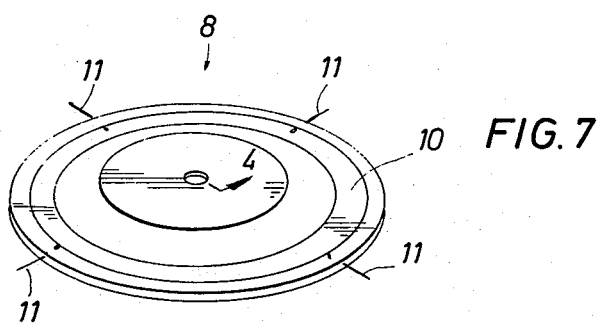
FIG. 7 is a pictorial representation of another form of apparatus embodying the present invention.
Figure 8:
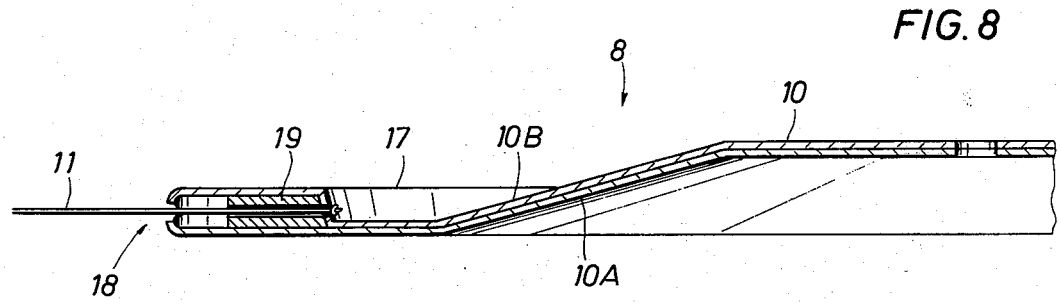
FIG. 8 is another pictorial representation of the apparatus depicted in FIG. 7.
Figure 9:
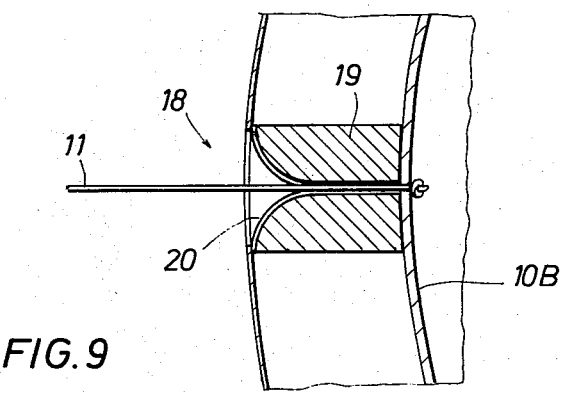
FIG. 9 is a pictorial representation of a portion of the apparatus suggested in FIG. 8.
Figure 10:
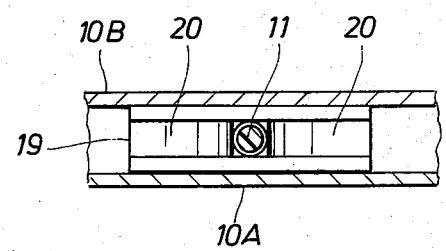
FIG. 10 is another view of the apparatus depicted in FIG. 9.

Referring to FIGS. 5 and 6, there may be seen a pictorial illustration of the configuration of the swath cut by the rotating cord members 11 if this vertical deflection has not been overcome. In particular, it will be seen that each swath 15 will have a rounded or convex configuration produced by the upward deflection of the cord member 11, whereas what is desired is a flat appearance or shape.

Referring now to FIGS. 7-10, there may be seen a modified form of the cutting assembly 8 previously depicted in FIGS. 2-4, wherein special provision has been made to support the cord member 11 against such deflection. In particular, it will be seen that the cord member 11 is supported within a mounting bracket 19 having a channel portion sufficient to support at least 50% of the overall length of the cord member 11, and which is further provided with flared or curved curvilinear side wall line-bearing surfaces 20 at the exit portion of the bracket 19, whereby the cutting line will be supported in a curvilinear manner in the event that such deflection does occur. The purpose of these curvilinear surfaces 20 is not to support the cutting line 11 against deflection, but to provide that if such deflection occurs, the cord member 11 will have a curvilinear configuration and will therefore not be subject to abnormal breakage which will result if the line member 11 is angularly deformed.

Referring again to FIG. 8, it will be seen that in this form of the invention the cutting mbmer 11 is preferably supported in a horizontal position relative to the rim of the plate members 10, which has been found to produce a better cutting result than when the cutting line or cord member 11 is directed in a downward manner, as suggested in the apparatus depicted in FIGS. 2-4.

Figure 11:
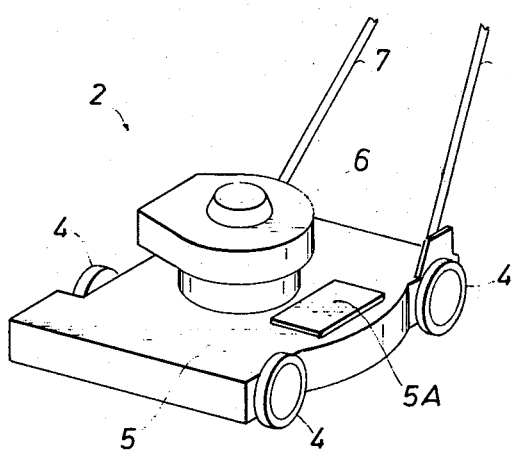
FIG. 11 is another pictorial representation of the apparatus depicted in FIGS. 1 and 5.

There may be seen in FIG. 11 another pictorial representation of a lawn mower similar to that depicted in FIG. 1, and wherein there is provided a removable portion 5A of the shroud 5, whereby access may be had to the cutting assembly 8. It has been found that if the cord members 11 are mounted and supported in the manner depicted in FIGS. 7-10, they will actually experience very little wear and breakage due to contact with grass, but that they are sometimes subject to breakage upon encountering foreign objects such as rocks or other debris in the grass. In the event such cord members require replacement, the removable lid portion 5A in the shroud 5 permits them to be reached and replaced without a lawn mower tool.

Figure 12:
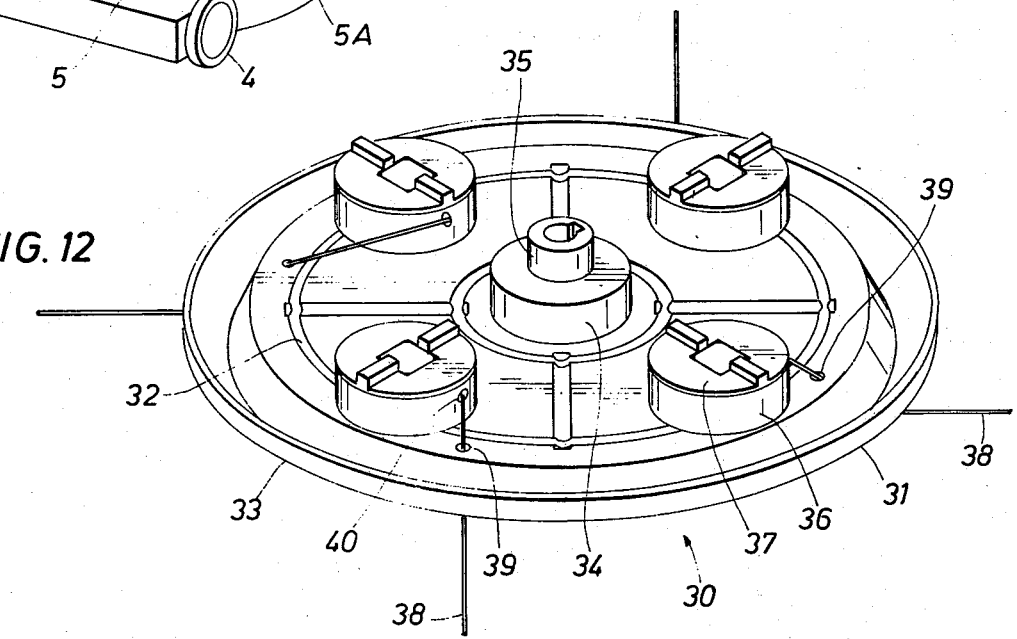
FIG. 12 is a pictorial representation of another form of apparatus embodying the present invention.
Figure 13:
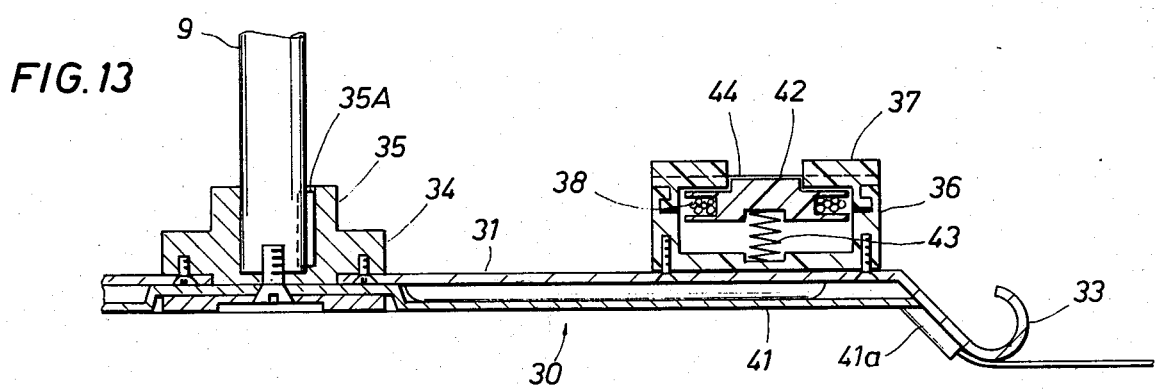
FIG. 13 is another view of a portion of the apparatus depicted in FIG. 12.
Figure 14:
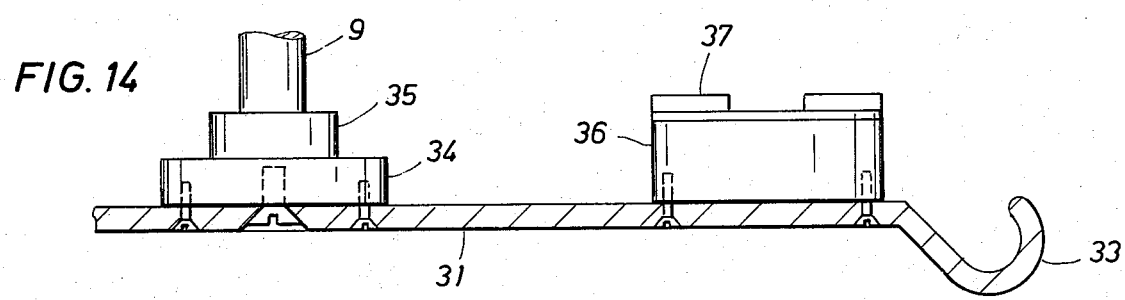
FIG. 14 is a further view of a portion of the apparatus depicted in FIG. 12.

Referring now to FIGS. 12-14, there may be seen a pictorial representation, partly in cross-section, of another form of cutting assembly 8. More particularly, this cutting assembly 8 may be seen to be formed of a generally flat but circular member having a downwardly directed and upwardly rolled rim portion 33, and further being provided with a series of ribs 32 for strengthening purposes. The plate member 31 is preferably mounted on the end of the motor shaft 9 by means of a centrally located hub 34 and collar 35, which is preferably provided with a keyway 35A or other suitable means for preventing rotation of the plate member 31 upon the motor shaft 9.

Referring again to FIG. 12, it will be seen that the plate member 31 may be provided with a plurality of circular housings 36 mounted in an equally spaced-apart manner on the upper surface of the plate member 31 and adapted to enclose and support a spool 42 which contains a portion of the cutting line or cord 38 wound thereupon. The cord 38 may be seen to depart from the spool 42 through a hole or aperture 40 in the side of the spool housing 36, and then be threaded down through another aperture 39 in the plate member 31 so as to pass over the underneath and curved portion of the rolled rim 33 of the plate member 31. The purpose of the rolled rim portion 33 is to provide for curvilinear deformation of the free traveling end of the cord 38, and also to provide a basis for support of the cord 38 as it extends radially from the periphery of the plate member 31.

Referring now to FIGS. 15-17, there may be seen a more detailed representation of the manner in which the unwound portion of the cord member 38 is threaded through the aperture 40 in the housing 36, and thereafter through a suitable aperture 39 in the upper portion of the plate member, so that it eventually extends under the rolled rim portion 33 of the plate member 31. This configuration of plate member 31 does not provide substantial support of the cutting portion of the cord member 38 with respect to vertical deflection, nor does it provide much support insofar as lateral deflection of the cord member 38 is concerned. However, it has been found that this arrangement is quite suitable for supporting the cord member 38 against excessive breakage when it encounters foreign objects amid the vegetation sought to be cut.

Referring again to FIGS. 16 and 17, it may be seen that the cord member 38 is wound upon a suitable spool member 39A having a square knob-like portion 38A on its upper end, and which is preferably inserted within the housing 36 so as to extend its unwound portion of the cord member 38 through the side wall aperture 40. In addition, a suitable spring member 43 is preferably located under the spool member 39A, so as to urge the spool member upwardly out of the housing 36. A suitable lid or cap 37, having gripping portions 37B and a flange 37C, is provided for enclosing the spool member 39A within the housing 36. The flange portion 37C of the cap 37 will pass through the recesses 36C for engagement in the threaded portion in the interior of the housing 36, and a square aperture 37A is provided for receiving the knob portion 38A of the spool member 38 and for acting as a detent to prevent unwanted rotation of the spool member 39A within the housing 36. Accordingly, in the event that the extended or cutting portion of the cord member 38 is broken, replacement cord may be obtained by merely depressing the knob portion 38A of the spool 39A and by thereafter rotating the spool 39A so as to unwind additional lengths of cord member 38.

As hereinbefore stated, the length of the cord member or cutting line is a function of its cutting effectiveness, and therefore it is desirable that the unwound or extended portion of the cord member 38 be maintained at a preselected length. The cord member may be selectively cut, of course, but where the cord member is wound on a spool, as indicated in FIG. 16, and where replacement lengths of cord are intended to be unwound as needed, it is preferable that means be provided so as to cut this cord member 38 according to a preselected length. As may be seen in FIG. 17, this may be effectively accomplished by mounting a knife or other suitable cutting member 45 within the shroud 5 and having its cutting edge positioned so as to be intersected by the revolving cord member 38.

Figure 19:
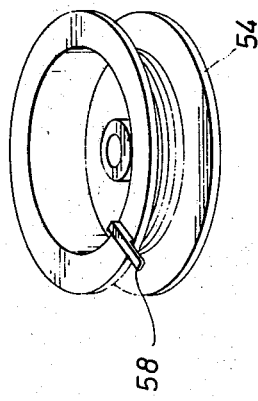
FIG. 19 is a pictorial representation of a portion of the apparatus depicted in FIG. 18.
Figure 18:
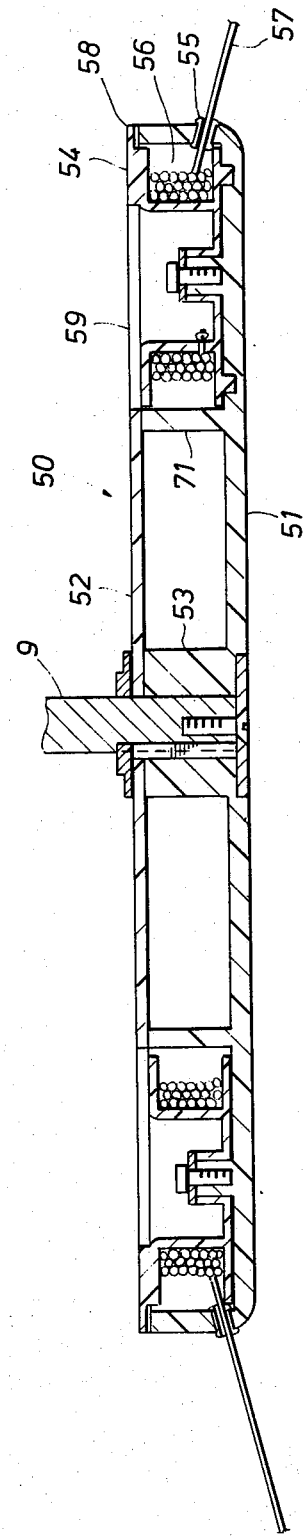
FIG. 18 is a pictorial representation of another form of apparatus embodying the present invention.
Figure 23:
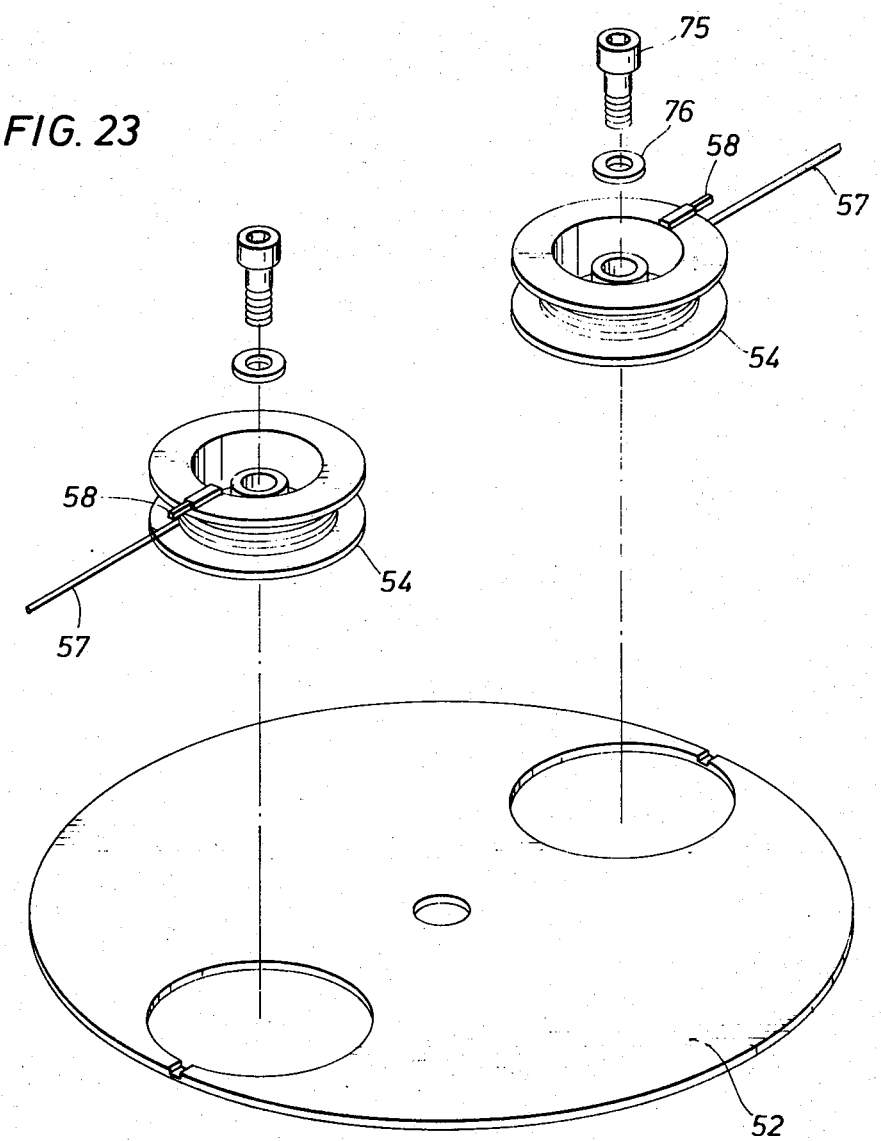
FIG. 23 is a pictorial representation of a different portion of the apparatus depicted in FIG. 18.
Figure 22:
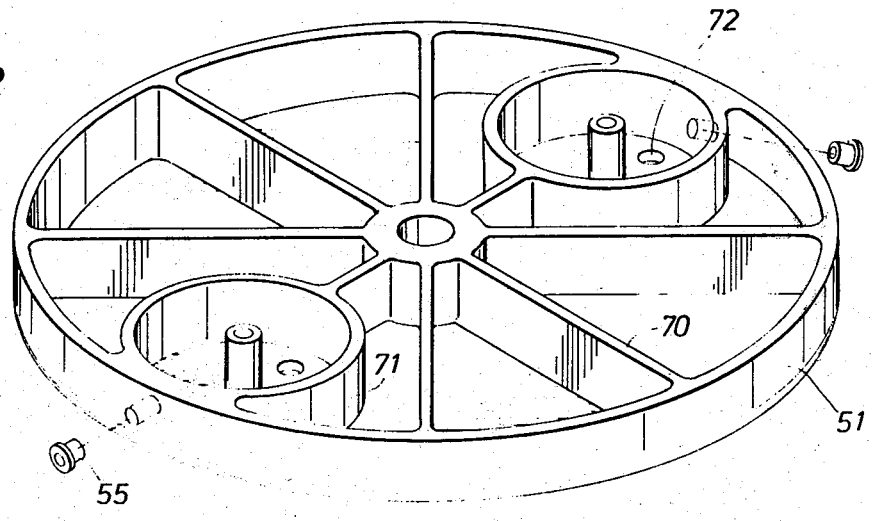
FIG. 22 is a pictorial representation of a different portion of the apparatus depicted in FIG. 18.

Referring now to FIG. 18, there may be seen a pictorial representation of another form of cutting assembly 50 embodying the concept of the present invention and comprising a hollow disc-like member concentrically mounted for rotation by the motor shaft 9. More particularly, it may be seen that this assembly is composed of a lower member 51 having a configuration as depicted in FIG. 22 and having a cover portion 52 as depicted in FIG. 23. The lower portion 51 may have reinforcing ribs 70 and will preferably have a circular holder portion 71 for supporting a spool 54 of the type depicted in FIG. 19. Accordingly, a length of cutting line 56 may be wound upon the spool 54 and have its unwound or extended end threaded through an aperture in the periphery of the lower member 51 and protected by a metallic eye member 55 for preventing breakage of the free traveling end of the cord member 57.

Figure 20:
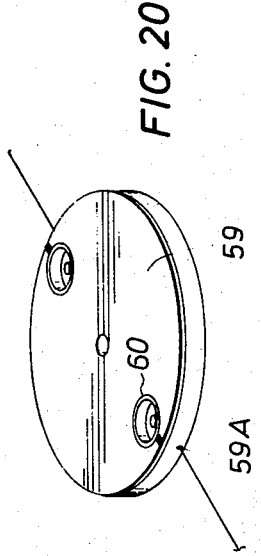
FIG. 20 is a pictorial representation of a different portion of the apparatus depicted in FIG. 18.

The spool member 54 is preferably provided with a projection 58 on its upper end, whereby it may be conveniently removed from the housing portion 71 of the lower member 51. In addition, however, the spool member 54 is preferably enclosed within a housing portion 71 by a removable cap 59 of the type depicted in FIG. 20 and having a pair of apertures by which the spool 54 may be reached and depressed within the housing 71 so as to disengage its projection 58 from the notch 59A in the cap 59.

Figure 21:
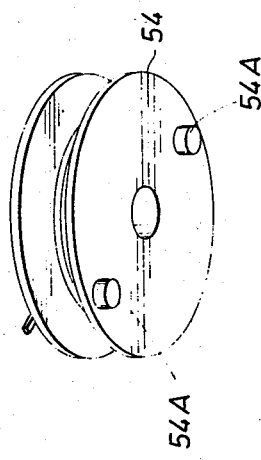
FIG. 21 is a pictorial representation of a different portion of the apparatus depicted in FIG. 18.

The spool 54 is mounted within housing 71 on a spring member of the type shown in FIG. 16 and is provided with downwardly directed projections 54A, as illustrated in FIG. 21. These projections 54A extend downwardly through apertures 72 in member 51 to prevent rotation of spool member 54 within housing 71 as shown in FIG. 22.

As hereinbefore stated, it is an object of this invention to provide a lawn mower having flexible, non-metallic cutting elements instead of the conventional rigid metal blade, in order to achieve safety to not only the operator but also to persons and property within its vicinity. It is also an object of the present invention to provide a lawn mower of this type which will also achieve effective cutting.

The Weed Eater edger/trimmer has shown that a flexible non-metallic cord can be used to cut vegetation. As hereinbefore explained, the rigid metal blade cannot be replaced by a cutting head of the type employed by the Weed Eater edger for the following reasons. In the first place, flexible cords tend to be deflected upwardly from the cutting plane by the grass sought to be cut. Furthermore, the extent of such upward deflection will not only increase as a function of the amount of vegetation encountered, but also as a function of the forward velocity of the lawn mower assembly across the greensward. This problem has not previously been encountered with apparatus of the type exemplified by the Weed Eater trimmer, because an edger/trimmer is moved more slowly during its use, and also because the operator of a Weed Eater trimmer tends to compensate for this effect by instinctively changing its cutting plane, whereas a rotary lawn mower may not be manipulated by its operator so as to change the position of its cutting plane.

In addition to this problem, it should be noted that flexible non-metallic cords tend to produce a blowing effect which, in turn, tends to blow the grass away from the tips of the cutting lines. This, in turn, tends to cause the grass to lie down in front of the mower, which also tends to restrict its effectiveness as a cutting device. The rigid blade in a conventional rotary-type lawn mower is formed to act as a fan to draw the grass upwardly into the blade, but this advantage is not present with a lawn mower employing flexible cords as its cutting elements.

Another problem arises from the fact that the flexible cords tend to yield to the grass which they encounter. A steel blade will not yield but instead will tend to be retarded within its cutting plane, with the result being that the motor will bog down and perhaps even die. A flexible non-metallic cord will, in contrast, be directed in a horizontal manner and will yield to the uncut grass rather than to stall the motor. In this event, the motor tends to continue operating but ineffective cutting results as the mower moves more rapidly into the grass sought to be cut, or in the event that it encounters denser vegetation. Also, a collateral disadvantage is that the cords tend to become abraded because of friction with uncut grass.

It has been proposed to tilt the cutting plane of the mower as a function of its forward speed in order to overcome this problem. However, such a solution to the problem would require complex and expensive apparatus, thereby greatly limiting the desirability of a lawn mower employing flexible cords as cutting elements.

It is now understood that cutting effectiveness of a flexible non-metallic cord is primarily a function of impact, and that impact, in turn, is primarily a function of velocity and mass of the tip of the revolving cord. The mass, of course, is primarily a function of the diameter of the cutting tip, since the non-metallic cord is of a relatively light weight.

It has been proposed to overcome the foregoing problems by increasing cutting velocity, and this is beneficial to a point. However, increasing cord velocity also requires an increase in power which, in turn, is obviously disadvantageous. Second, increasing the cord velocity without also increasing the cord mass can only be accomplished up to the point where the extended portion of cutting line tends to lag rotation of the plate member because of wind resistance.

The foregoing problems may also be attached by increasing the mass of the cutting tip of the cord, i.e., by increasing its diameter. If the diameter is increased, however, this also compels an increase in power merely to maintain the pre-established velocity, and also windage (wind resistance) is a special problem with a cord formed of a light-weight material such as nylon. Increasing the diameter and the tip velocity of the cutting cord will, of course, be helpful, but this not only requires additional power but also increases the wear to be experienced by the cutting lines. In addition, an increase in tip velocity will also create problems of vibration and friction within the overall assembly.

The problems are overcome with apparatus of the type best embodied by the plate member depicted in FIGS. 7–10, whereby the extended portion of the cutting lines 11 projects from apertures in the periphery of the plate member 10, and whereby these apertures are defined by curvilinear line bearing surfaces 20, as hereinbefore explained. A further feature is to limit the extended length of the cutting line 11 to a length whereby the stiffness of the line is sufficient to aid in avoiding deflection, and yet whereby the flexibility is sufficient to avoid creating safety problems. More important, however, is the fact that the extended portion of the line should not be greater than the portion of the line secured along its length by the support member 19. A particularly suitable length has been found to be approximately 1¼″, and therefore at least 1¼″ of line should be enclosed within the support member 19. The length of the cutting line 11 is, of course, a function of its diameter, and these dimensions have been found most suitable with respect to a cutting line 11 having a diameter of 0.100″.

Many other modifications and alternatives to the apparatus and techniques hereinbefore described will be readily apparent to those of ordinary skill in this art. Accordingly, the structures and techniques described herein and depicted in the accompanying drawings are intended to be exemplary only and are not intended as limitations on the scope of this invention.

What is claimed is:

1. In a rotary-type lawn mower having a wheeled chassis adapted to travel over a greensward and carrying a motor having a rotatable shaft, the improvement comprising:
   a head member having at least one peripheral aperture and mounted on said shaft for rotation in a cutting path aligned substantially parallel with said greensward and intersecting vegetation thereon,
   at least one one non-metallic cord-like cutting member disposed partially in said head member and having a finger-like free traveling end portion extending from said aperture outwardly of said head member into said cutting path, and
   support means having an elongate passageway connecting with and extending with said head member from said aperture for restraining an adjacent portion of said cutting member along a length sufficient to support said free traveling end portion of said cutting member against deflection from said cutting path by said vegetation.

2. A lawn mower mechanism for mowing the vegetation growing on turf, said mechanism comprising:
   powered rotary means on a wheeled chassis,
   shaft means being rotated by said powered rotary means,
   a rotor element being non-rotatably connected to said shaft means and being rotated along with said shaft by said powered rotary means,
   at least one flexible cord-like member being supported by said rotor element and having a portion thereof extending substantially radially outwardly from said rotor element, said cordlike member being rotatable in a cutting plane,
   rotatable spool means being supported by said rotor element,
   support means having an elongate passageway connecting with and extending with said rotor element for restraining an adjacent portion of said cord-like member along a length sufficient to support a free traveling end portion of said cord-like member against deflection from said cutting plane by said vegetation,
   said cord-like member being wound about said rotatable spool means with the free extremity thereof engaging said support means and extending radially outwardly from said rotor element for cutting engagement with said vegetation,
   housing means at least partially surrounding said rotor means, and
   cord cutter projection means being supported by said housing means, said cord cutter projection means being struck by the free extremity of said cord-like element when said cord-like element is of excessive length, causing said cord-like element to be severed to a predetermined maximum length upon rotation of said rotor element.

3. A lawn mower mechanism as recited in claim 2, wherein:
   said support means defines in said passageway of an elongated channel, and
   said cord-like member extends through said channel with a free portion thereof extending substantially radially beyond the other periphery of said rotor element.

4. A lawn mower mechanism as recited in claim 2, wherein:
   said support means defines in said passageway of an elongated channel,
   said cord-like member extending through said channel with a free portion thereof extending substantially radially beyond the outer periphery of said rotor element, and
   curvilinear surface means is defined by said support means and provides support for said cord-like member upon deflection of said cord-like member within said cutting plane.

5. A lawn mower mechanism as recited in claim 4, wherein:
   said curvilinear surface means is defined by opposed curvilinear surfaces flaring outwardly from said channel.

6. A lawn mower mechanism as recited in claim 3, wherein said rotor element includes:
   cord abutment means being formed to define at least one aperture, said aperture being disposed in registry with said channel, and
   said cord-like element being of elongated configuration having an enlargement formed at the radially inward extremity thereof, said enlargement engaging said cord abutment means and retaining said cord-like element in assembly with said rotor means against the effect of centrifugal force developed on said cord-like element during rotation of said rotor element.

7. A lawn mower mechanism as recited in claim 6, wherein said enlargement is a knot formed in said cord-like element.

8. A lawn mower mechanism as recited in claim 2, wherein said rotatable spool means includes:
   means preventing rotation of said spool means, and
   means releasing said rotation preventing means and allowing rotation of said spool means.

9. Lawn mower apparatus for mowing a greensward and the like, comprising:
   chassis means having a plurality of spaced-apart wheel members,
   driving means arranged on said chassis means and having a rotatable shaft downwardly directed toward said greensward,
   a generally circular support member fixedly attached to said shaft of said driving means between said wheel members for rotation in a cutting plane adjacent and generally aligned with the surface of said greensward and having a plurality of apertures in its perimeter,
   a plurality of separate flexible cord-like non-metallic and elongate cutting members each radially and slidably inserted in said apertures for radial projection from said perimeter of said support member generally in said cutting plane, and
   engaging means for securing each of said cutting members from slidable ejection from said support member during rotation of said shaft of said driving means, but permitting selective withdrawal of said cutting members from said apertures in a direction from said perimeter towards said shaft and providing supporting engagement for at least a portion of each of said cord-like member, and support means having an elongate passageway connecting with and extending with said support member from each said aperture for restraining an adjacent portion of each said cutting member along a length sufficient to support a free traveling end portion of said cutting member against deflection for said cutting plane by vegetation.

10. A lawn mower according to claim 9 wherein the engaging means is flared at the exit end of the apertures.

11. A lawn mower according to claim 10 wherein the flaring is greater in the direction of the cutting plane than in the vertical.

12. A lawn mower according to claim 11 wherein a predetermined length of the cord-like member is supported by said engaging means.

13. A lawn mower according to claim 12 wherein 30 – 70% of the length of said cord-like member is supported by said engaging means.

14. A lawn mower according to claim 9 wherein said support is of unitary construction and comprises a lower dish-like plate member, an upper ring-like member, and the engaging means being enclosed by the upper and lower members, said engaging means having said passageway provided by a channel extending therethrough, the cord-like member being located in said channel and having a portion extending outwardly of the periphery of the engaging means to a predetermined length.

15. A lawn mower according to claim 14 wherein the upper and lower members are located in a substantially horizontal plane.

16. A lawn mower according to claim 15 wherein said engaging means is flared at the exit end of the channel.

17. A lawn mower according to claim 9 including means for cutting the cord-like member to a preselected length.

18. A lawn mower according to claim 9 wherein the support member includes upper and lower surfaces, the lower surface thereof being free of protuberances.

19. In a rotary-type lawn mower having a wheeled chassis adapted to travel over vegetation-covered ground's surface and carrying a prime mover for rotating a downwardly-extending vertical driving shaft, the improvement comprising:
  a planar head member mounted on said driving shaft for rotation about a vertical axis relative to the ground's surface and said head member having a peripheral aperture,
  at least one non-metallic flexible elongated cutting member carried on said head member and extending in a finger-like free-traveling end portion radially outwardly from said aperture on said head member into a cutting plane residing substantially perpendicular to the vertical axis,
  mounting means for releasably securing each cutting member within an aperture adjacent the periphery of said head member, and
  support means having an elongate passageway connecting with and extending with said head member from said aperture for restraining an adjacent portion of said cutting member along a length sufficient to support said free traveling end portion of said cutting member against deflection from said cutting plane by said vegetation.

20. The lawnmower of claim 19 wherein the cutting member has a length of at least twice its greatest width.

21. The lawnmower of claim 20 wherein the cutting member has a cross-sectional dimension of at least 0.100 inch at its free end in contact with the vegetation being cut.

22. The lawnmower of claim 19 wherein the cutting member extends radially beyond the head member by not greater than about 50 percent of its length.

23. The lawnmower of claim 19 wherein said cutting member is positioned in said head member by said mounting means with the free-traveling end portion inclined downwardly toward the ground's surface.

24. The lawnmower of claim 19 wherein the cutting member has between about 30 to 70 percent of its length held against vertical deflection by said support means on said head member.

25. The lawnmower of claim 19 wherein said cutting member extends radially beyond said head member about 1½ inches.

26. The lawnmower of claim 19 wherein said head member is a disc having a diameter between about 15 and about 19 inches and each said cutting member defines a vegetation-cutting swath between about 18 and 22 inches in width, respectively.

27. In a rotary-type lawn mower having a wheeled chassis adapted to travel over the ground's surface and carrying a prime mover for rotating a downwardly-extending driving shaft, the improvement comprising:
  a disc-like head member mounted on said driving shaft for rotation about a vertical axis relative to the ground's surface,
  said head member having a peripheral circular rim and carrying aperture means at equal angular spacings about said head member,
  non-metallic flexible elongated cutting members carried on said head member and passing through said aperture means to extend in finger-like free-traveling end portions radially outwardly from said circular rim on said head member and into a cutting plane residing substantially perpendicular to the vertical axis,
  mounting means on said head member for releasably securing said cutting members against unintended radial displacement from said aperture means; and
  support means having an elongate passageway connecting with and extending with said head member from said aperture for restraining an adjacent portion of said cutting member along a length sufficient to support said free traveling end portion of said cutting member against deflection from said cutting plane by said vegetation.

28. The lawnmower of claim 19 wherein said cutting members have a length supported in said passageway against vertical deflection by said support means equal in length to said free-traveling end portion extending from said circular rim into the cutting plane.

29. The lawnmower of claim 28 wherein said cutting members have a dimension of at least 0.100 inch at the free-traveling end portions in contact with vegetation.

30. The lawnmower of claim 27 wherein said cutting members are circular in cross-section and are carried upon spool means on said head member with end portions of said cutting members extending through said aperture means into the cutting plane.

31. The lawnmower of claim 27 wherein said cutting members have free-traveling end portions extending about 1¼ inches beyond said circular rim into the cutting plane.

32. The lawnmower of claim 27 wherein said head member has a diameter between about 15 and 19 inches and said cutting members define a vegetation cutting swath about three inches greater in width than said head member.

33. The lawnmower of claim 27 wherein said cutting members are formed of a monofilament polymeric material with an enlargement at one end thereof forming an engagement means to secure said cutting members in said head member against radial outward displacement.

34. The lawnmower of claim 27 wherein said cutting members each extend about 2¼ inches beyond said circular rim with a cross-sectional dimension of at least 0.100 inches at their free end in contact with the vegetation being cut.

* * * * *

UNITED STATES PATENT OFFICE
CERTIFICATE OF CORRECTION

Patent No. 4,112,653          Dated September 12, 1978

Inventor(s) George C. Ballas and Albert W. Mitchell

It is certified that error appears in the above-identified patent and that said Letters Patent are hereby corrected as shown below:

Column 10, line 48:   "The" should be -- These --.

Column 12, line 9 :   "extending" should be -- extends --.

Column 13, line 16:   "30" should be -- 30% --.

Column 13, line 20:   "support is" should be -- support member is --.

Column 14, line 18:   "1-1/2" should be -- 1-1/4 --.

Column 14, line 52:   "19" should be -- 27 --.

Signed and Sealed this

Sixth Day of March 1979

[SEAL]

Attest:

RUTH C. MASON
Attesting Officer

DONALD W. BANNER
Commissioner of Patents and Trademarks